United States Patent
Fablet et al.

(10) Patent No.: US 9,648,119 B2
(45) Date of Patent: May 9, 2017

(54) METHODS AND DEVICES FOR EXCHANGING DATA

(71) Applicant: CANON KABUSHIKI KAISHA, Tokyo (JP)

(72) Inventors: Youenn Fablet, La Dominelais (FR); Nael Ouedraogo, Maure de Bretagne (FR); Herve Ruellan, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 119 days.

(21) Appl. No.: 14/327,035

(22) Filed: Jul. 9, 2014

(65) Prior Publication Data

US 2015/0019676 A1 Jan. 15, 2015

(30) Foreign Application Priority Data

Jul. 12, 2013 (GB) .................................. 1312560.4

(51) Int. Cl.
 *G06F 15/16* (2006.01)
 *H04L 29/08* (2006.01)
 *G06F 17/30* (2006.01)
 *H04W 4/18* (2009.01)

(52) U.S. Cl.
 CPC .............. *H04L 67/26* (2013.01); *G06F 17/30* (2013.01); *H04L 67/289* (2013.01); *H04L 67/2842* (2013.01); *H04W 4/18* (2013.01)

(58) Field of Classification Search
 None
 See application file for complete search history.

(56) References Cited

U.S. PATENT DOCUMENTS

| | | | | |
|---|---|---|---|---|
| 2008/0104269 | A1* | 5/2008 | Vitanov | G06F 17/30902 709/236 |
| 2013/0159383 | A1* | 6/2013 | Tuliani | H04L 67/2842 709/203 |
| 2014/0372624 | A1* | 12/2014 | Wang | H04L 65/60 709/231 |

FOREIGN PATENT DOCUMENTS

| | | |
|---|---|---|
| GB | 2503452 A | 1/2014 |
| WO | 2007/009255 A1 | 1/2007 |

\* cited by examiner

*Primary Examiner* — Ranodhi Serrao
(74) *Attorney, Agent, or Firm* — Canon USA, Inc. I.P. Division (57) ABSTRACT

The present invention relates to the exchange of data between a server and a receiving device. The exchange method comprises receiving, at the receiving device, a push message comprising pushed data from the server; storing received pushed data in a cache memory of the receiving device, the stored data being identified as being of push type; transmitting, from the receiving device to the server, a request for data comprising information about pushed data stored in the cache memory of the receiving device; and receiving, from the server, at the receiving device, a response to said request comprising requested data.

19 Claims, 6 Drawing Sheets

METHODS AND DEVICES FOR EXCHANGING DATA

This application claims the benefit under 35 U.S.C. §119 (a)-(d) of United Kingdom Patent Application No. 1312560.4, filed on Jul. 12, 2013 and entitled "METHOD AND DEVICE FOR EXCHANGING DATA". The above cited patent application is incorporated herein by reference in its entirety.

FIELD OF THE INVENTION

The present invention relates in general to the use of cache information in network communication and in particular, to the exchange of data between a server and a receiving device comprising a cache memory configured to store pushed data, and to the transmission of such data by an intermediary node. The invention also relates to client-server communication system and proxy.

BACKGROUND OF THE INVENTION

Web resources such as web pages or streaming contents generally contain links to other data or resources, which themselves may contain links to other data. To fully load a web resource, all the linked and sub-linked data generally need to be retrieved. This incremental discovery may lead to a slow loading of the web resource, especially on high latency networks such as mobile networks.

Server push features are implemented in almost stateless servers that allow sending unsolicited data to receiving devices (or clients). Thus, when receiving a request for a given web resource, the server sends the requested resource and pushes linked data, hereafter called pushed data. Since data retrieved from a cache memory (called "cache" hereafter) located between the source (i.e. the server storing data) and the receiving device are known to be available mush more quickly than data retrieved from the server (network and server workload are reduced), the linked data are generally stored in the cache. The responsiveness of applications using such data is thus improved.

However, even if the load time of the web resource is reduced, the sending of pushed data occupies the bandwidth. In addition, some of the pushed data are already available to the receiving device, or not useful. Indeed, the server may push several times the same data. This implies an inadequate management of the bandwidth available for streaming the data.

Given that the server must handle thousands to millions of clients, storing the list of available data in the cache memory of all clients is not a realistic approach.

Moreover, some clients may remove some of these data depending on their own cache policy that may differ from a client to another. Indeed, each client chooses its own cache implementation. For instance, it may not cache any data, or on the contrary, it may cache all data that can be cached given the cache size. For example, Web client caches may vary from a few Megabytes to hundreds of Megabytes. Such Web clients generally use well-known eviction strategies such as LRU (for Least Recently Used) in order to release cache entries.

The variability of cache implementation (e.g. different eviction strategies, different cache size constraints) among clients makes it difficult for the source servers to precisely know which previously pushed data are still available in the cache memory of clients at the time of the request.

SUMMARY OF THE INVENTION

The present invention has been devised to address one or more of the foregoing concerns, with light of limiting the push of unneeded data to a receiving device.

In this context, according to a first aspect of the invention, there is provided a method of obtaining data from a server, the method being implemented at a receiving device and comprising the following steps:
- receiving a push message comprising pushed data from the server;
- storing received pushed data in a cache memory of the receiving device, the stored data being identified as being pushed data;
- transmitting a request for data comprising information about pushed data stored in the cache memory of the receiving device;
- receiving a response to said request comprising requested data.

Correspondingly, the invention concerns a receiving device for obtaining data from a server, the receiving device comprising:
- a module for receiving a push message comprising pushed data from the server;
- a module for storing received pushed data in a cache memory of the receiving device, the stored data being identified as being of push type;
- a module for transmitting a request for data comprising information about pushed data stored in the cache memory of the receiving device;
- a module for receiving a response to said request comprising requested data.

According to a second aspect of the invention, there is provided a method of providing data from a server to a receiving device, the method being implemented at the server and comprising the following steps:
- receiving a request for data comprising information about pushed data stored in a cache memory of the receiving device;
- transmitting a response to said request comprising the requested data;
- transmitting a push message comprising further pushed data related to the requested data, the further pushed data being determined based on said information comprised in the request.

Correspondingly, the invention concerns a server for providing data to a receiving device, the server comprising:
- a module for receiving a request for data comprising information about pushed data stored in a cache memory of the receiving device;
- a module for transmitting a response to said request comprising the requested data,
- a module for transmitting a push message comprising further pushed data related to the requested data, the further pushed data being determined based on said information comprised in the request.

According to a third aspect of the invention, there is provided a method of exchanging data between a server and a receiving device, the method comprising the following steps:
- receiving, at the receiving device, a push message comprising pushed data from the server;
- storing received pushed data in a cache memory of the receiving device, the stored data being identified as being of push type;

transmitting, from the receiving device to the server, a request for data comprising information about pushed data stored in the cache memory of the receiving device; and receiving, from the server, at the receiving device, a response to said request comprising requested data.

Correspondingly, the invention concerns a system for exchanging data between a server and a receiving device, the system comprising:

a module for receiving, at the receiving device, a push message comprising pushed data from the server;

a module for storing received pushed data in a cache memory of the receiving device, the stored data being identified as being of push type;

a module for transmitting, from the receiving device to the server, a request for data comprising information about pushed data stored in the cache memory of the receiving device; and a module for receiving, from the server, at the receiving device, a response to said request comprising requested data.

Thus, the request by itself precisely informs which previously pushed data are still available in the cache memory of the receiving device at the request time.

This is due to the information included in the request that informs the server about what is currently in the cache memory at the time of the request.

Consequently, the server avoids pushing data that are already available at the receiving device and the bandwidth is thus not congested by unneeded transmission of pushed data.

Optional features of the invention are further defined in the dependent appended claims.

In a preferred embodiment, the method of obtaining data comprises the following steps:

computing a distance between the request and at least one previous request for previously requested data stored in the cache memory;

selecting at least one of the previous requests based on the distance to the request;

and said information concerns only pushed data stored in the cache memory, that have been pushed in response to the selected previous requests.

The distance may depend on:

the time delay between the request and the previous request; and/or a use frequency of the data pushed in response to the previous request and/or of the previously requested data; and/or the type of content of the previously data; and/or the degree of similarity between the source address of the requested data and the source address of the previously requested data.

According to that preferred embodiment, the server receives only information about pushed data stored in the cache memory that are relevant to the request. Consequently, the server may choose data to push that are more likely to be useful for the full loading of the requested data.

Furthermore, the overhead of the request is limited since said information is limited to a sub-part of the pushed data stored in the cache memory, and the choice of data to be pushed will be simplified for the server.

In one particular embodiment, the method of obtaining data comprises receiving a push message comprising further pushed data related to the requested data, said further pushed data being different from the pushed data already in the cache memory.

In one particular embodiment, the method of obtaining data comprises computing a link between the received requested data and the further pushed data.

Therefore, when preparing a subsequent request, the computed link previously data and related pushed data can be easily retrieved.

In one particular embodiment, when not used within a certain delay, the pushed data are referenced as unused.

In one particular embodiment, said information comprises an indication of the unused state of the pushed data when referenced as unused.

In one particular embodiment, the response or the push message from the server comprises an instruction to remove unused data from the cache memory.

This feature is of particular interest when data are particularly large (e.g. media data like video data).

In one particular embodiment, the method of providing data comprises inferring, based on the information in the received request, what data is to be further pushed to the receiving device.

In one particular embodiment, inferring comprises analyzing the type of content of the pushed data stored in the cache memory of the receiving device.

In one particular embodiment, the requested data are a web page.

In a variant, the requested data are a media description file or a media presentation file (MPD). The invention is of particular interest when performing Dynamic Adaptive Streaming over HTTP. In one particular embodiment, said information is an encoded representation of said pushed data.

Such encoded representation allows representing the cache memory, using as few bits as possible for each entry, thus avoiding extra-overhead.

In one particular embodiment, said representation comprises a list of ID unambiguously identifying each one of said pushed data and a corresponding cache state value.

In one particular embodiment, said ID is an URL or an ETag.

In a variant, when the requested data is a, MPD, said requested MPD may comprise a reference document associating each ID with corresponding pushed data.

According to a fourth aspect of the invention, there is provided a method of transmitting data from a server to a receiving device, the method being implemented at an intermediary node and comprising the following steps:

receiving, from the receiving device, a first request for data;

transmitting, to the server, a second request for the requested data, based on the first request and comprising information about data stored in a cache memory of the intermediary node, receiving, from the server, a response to said second request, said response comprising validity information about data stored in the cache memory of the intermediary node, transmitting, to the receiving device, a response to the first request comprising requested data, and transmitting, to the receiving message, at least one push message comprising further pushed data related to said requested data, the further pushed data being determined by the intermediary node from the data stored in the cache memory of the intermediary node, based on said validity information.

Correspondingly, the invention concerns an intermediary node for transmitting data from a server to a receiving device, the intermediary node comprising:

a module for receiving, from the receiving device, a first request for data;

a module for transmitting, to the server, a second request for the requested data, based on the first request and comprising information about data stored in a cache memory of the intermediary node, a module for receiving, from the server, a response to said second request, said response comprising validity information about data stored in the cache memory of the intermediary node, a module for transmitting, to the receiving device, a response to the first request comprising requested data, and a module for transmitting, to the receiving message, at least one push message comprising further pushed data related to said requested data, the further pushed data being determined by the intermediary node from the data stored in cache memory of the intermediary node, based on said validity information.

Thus, the server does not systematically push data to the intermediary node, since the intermediary node has already some pushed data in cache, that it may push to the client depending on the response from the server to the second request created based on the client cache information relative to the requested data.

The intermediary node may optimize the push strategy between client and server.

In one particular embodiment, the method of transmitting data comprises receiving, from the server, at the receiving device, a push message comprising further pushed data related to the requested data, the further pushed data being determined at the server, based on said information comprised in the request.

Correspondingly, the intermediary node may comprise a module for receiving, from the server, at the receiving device, a push message comprising further pushed data related to the requested data, the further pushed data being determined at the server, based on said information comprised in the request.

In one particular embodiment, said second information is about pushed data stored in a cache memory of the intermediary node, that are not stored in the cache memory of the receiving device.

This is particularly interesting in the case where the intermediary node has already some of the data to push in its cache memory.

In one particular embodiment, the response to the second request comprises an indication of whether there is or not a more recent version of the pushed data of the second information available on the server.

In one particular embodiment, said second information is an encoded representation.

In one particular embodiment, said representation comprises a list of ID unambiguously identifying each one of said pushed data and a corresponding cache state value.

In one particular embodiment, the method of transmitting data further comprises receiving, from the server, at the receiving device, a push message comprising further pushed data related to the requested data, the further pushed data being determined at the server, based on said information comprised in the request.

Figure 3:
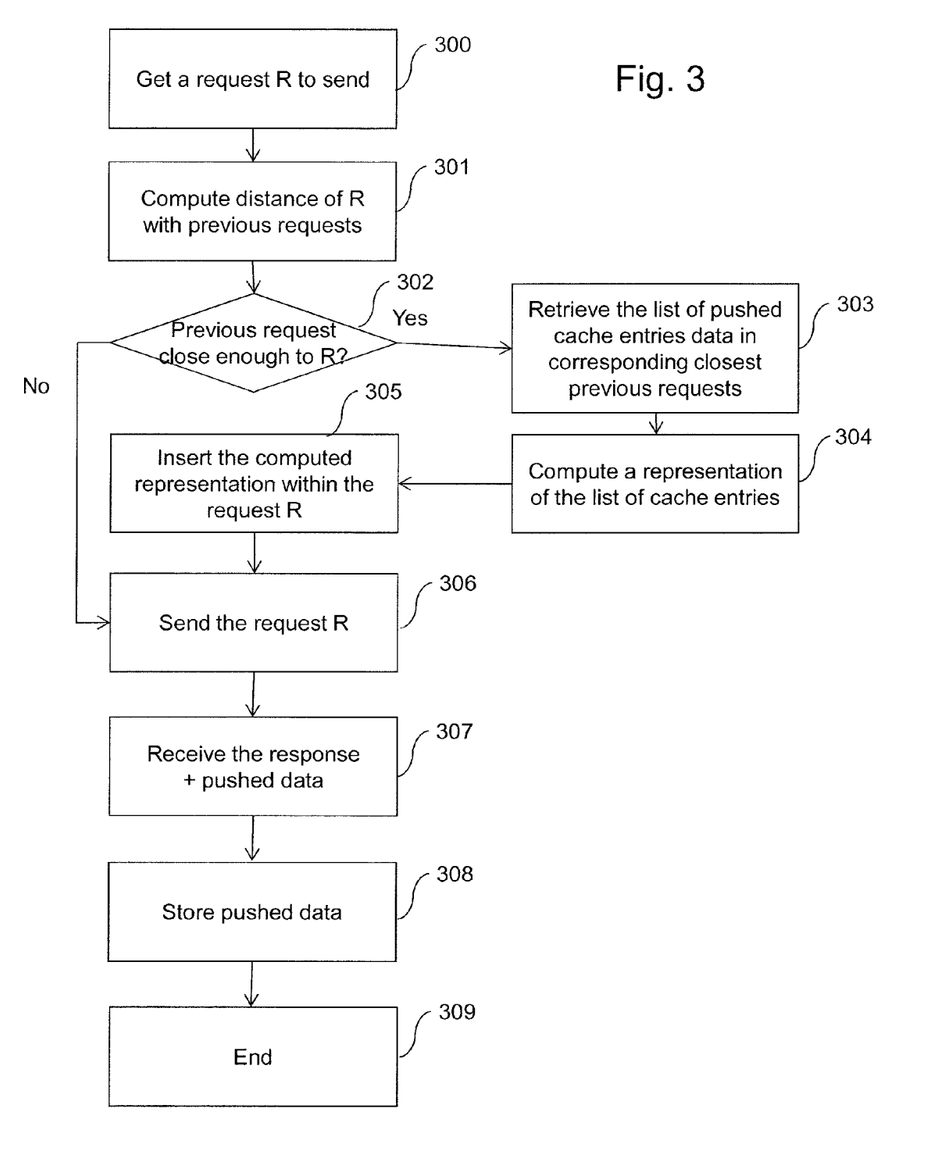
FIG. 3 is a flowchart illustrating general steps of a method for obtaining data according to embodiments of the invention.
Figure 6:
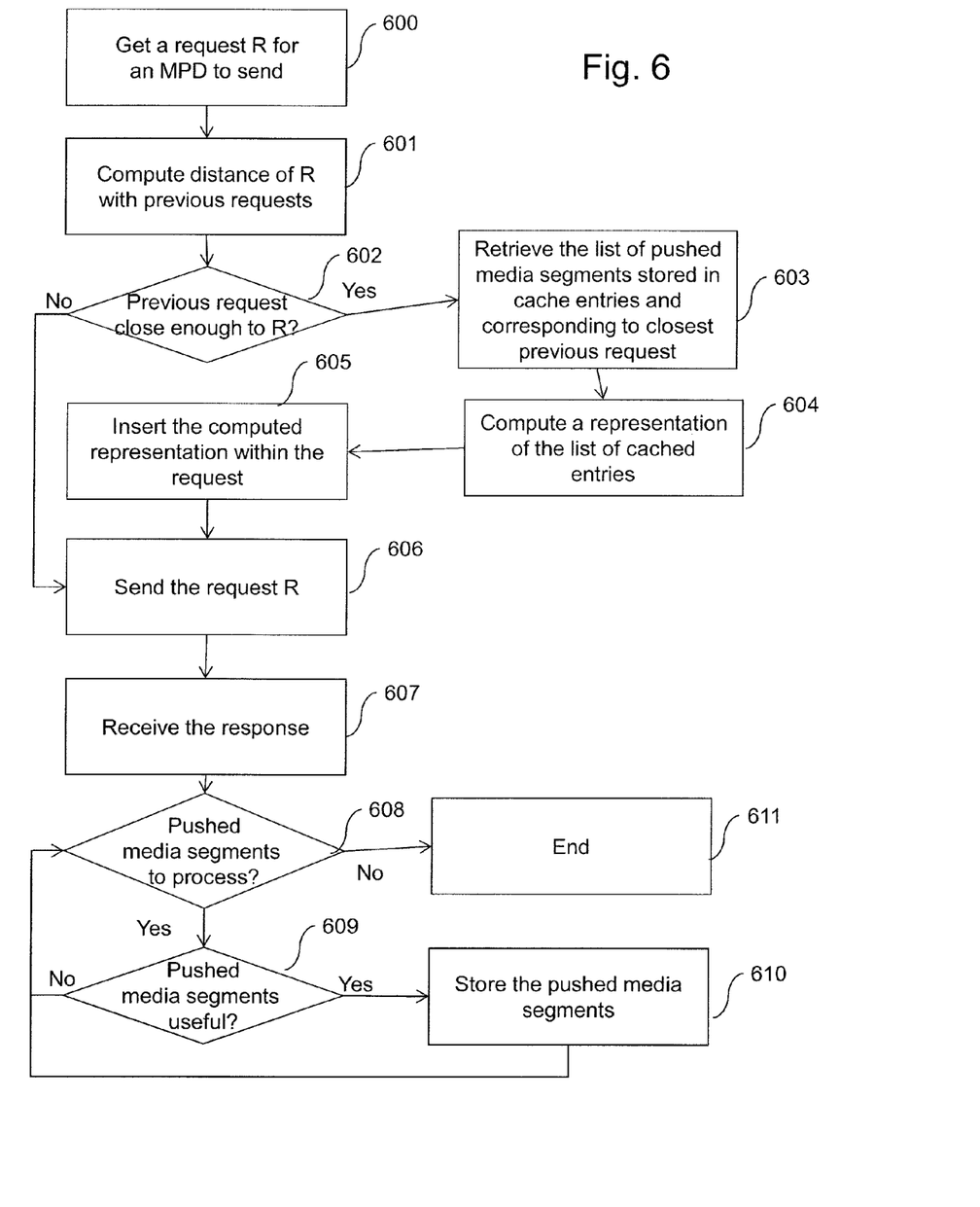
FIG. 6 is a flowchart illustrating steps of a method for obtaining data according to embodiments of the invention, in a context of Dynamic Adaptive Streaming over HTTP.

The invention also concerns a method for obtaining data as hereinbefore described, with reference to, and as shown in, FIG. 3 and FIG. 6 of the accompanying drawings.

Figure 4:
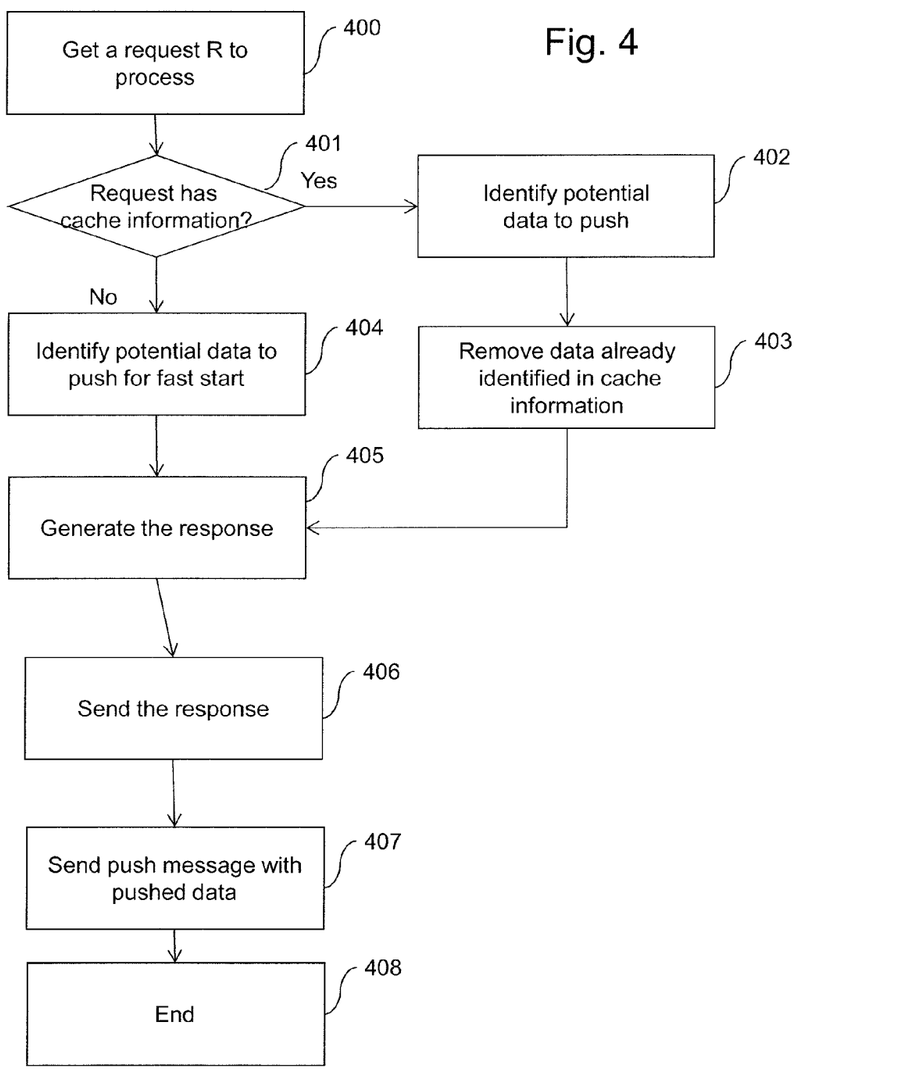
FIG. 4 is a flowchart illustrating general steps of a method for providing data to a receiving device according to embodiments of the invention.
Figure 7:
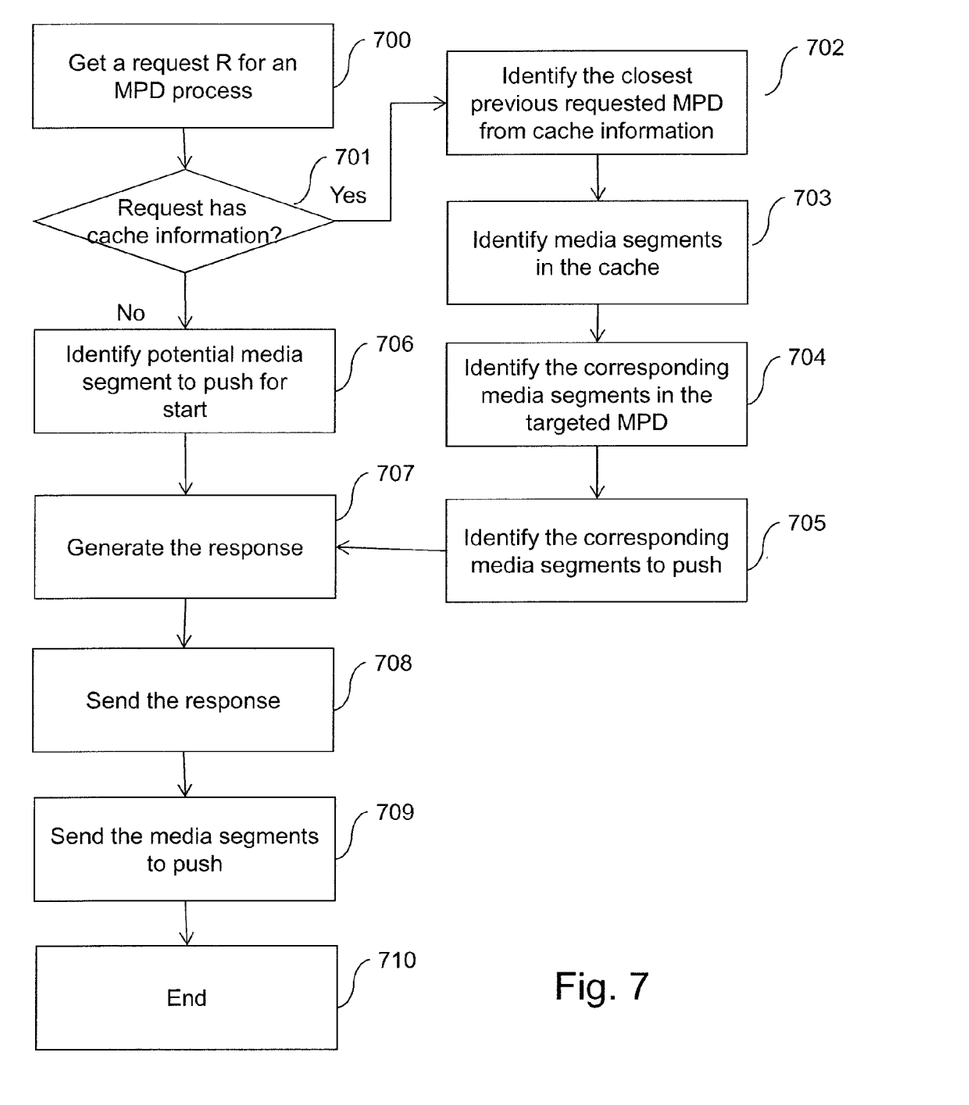
FIG. 7 is a flowchart illustrating steps for providing data to a receiving device according to embodiments of the invention, in a context of Dynamic Adaptive Streaming over HTTP.

The invention also concerns a method for providing data as hereinbefore described, with reference to, and as shown in, FIG. 4 and FIG. 7 of the accompanying drawings.

Figure 5:
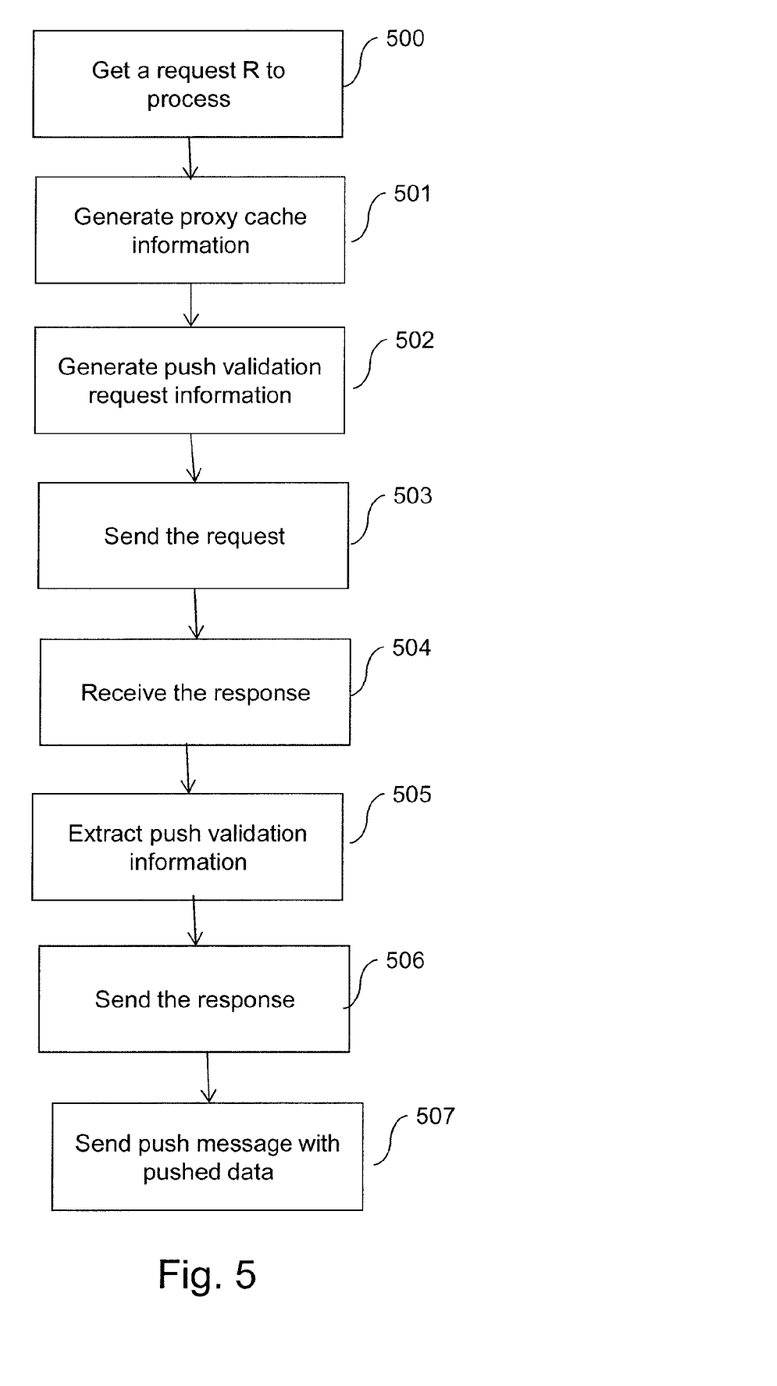
FIG. 5 is a flowchart illustrating general steps of a method for transmitting data from a server to a receiving device, according to embodiments of the invention.

The invention also concerns a method for transmitting data as hereinbefore described, with reference to, and as shown in, FIG. 5 of the accompanying drawings.

BRIEF DESCRIPTION OF THE DRAWINGS

Embodiments of the invention will now be described, by way of example only, and with reference to the following drawings in which.

DETAILED DESCRIPTION OF EMBODIMENTS OF THE INVENTION

The invention provides methods, systems and devices for exchanging, providing, obtaining and transmitting data from a server to a receiving device.

In particular, the invention consists in providing information to a server about pushed data stored in a cache memory of a receiving device.

Thus, when receiving a request from the receiving device, the server precisely know which previously pushed data are still available in the cache memory of the receiving device.

Figure 1:
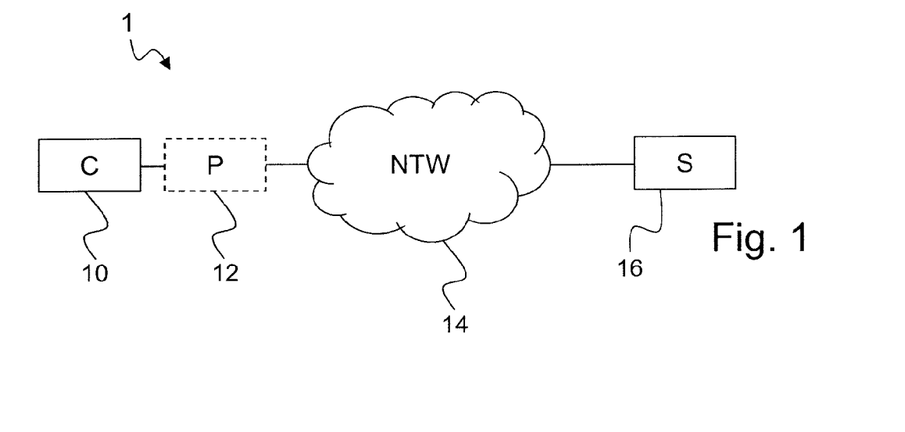
FIG. 1 illustrates a typical web client-server communication system in which embodiments of the invention may be implemented.

FIG. 1 shows a typical web client-server communication system 1 in which embodiments of the invention may be implemented.

It comprises a communication network NTW 14 such as an IP-based local or wide area network (LAN, WAN), a client device C 10 also called receiving device, and a web server device S 16 that offers IP-based services such as web sites or media streaming, and into which push features are implemented.

In the typical system 1, the client device C 10 implements a web browser through which a user interacts to generate and send HTTP requests to the web server device S in order to request web resources, hereafter referred as requested data, e.g. web pages, media file descriptions or MPD (for Media Presentation Description).

In some embodiments, an intermediary node 12 such as a proxy P located between the client and the server is provided to handle the requests and responses between the client 10 and the server 16.

Figure 2:
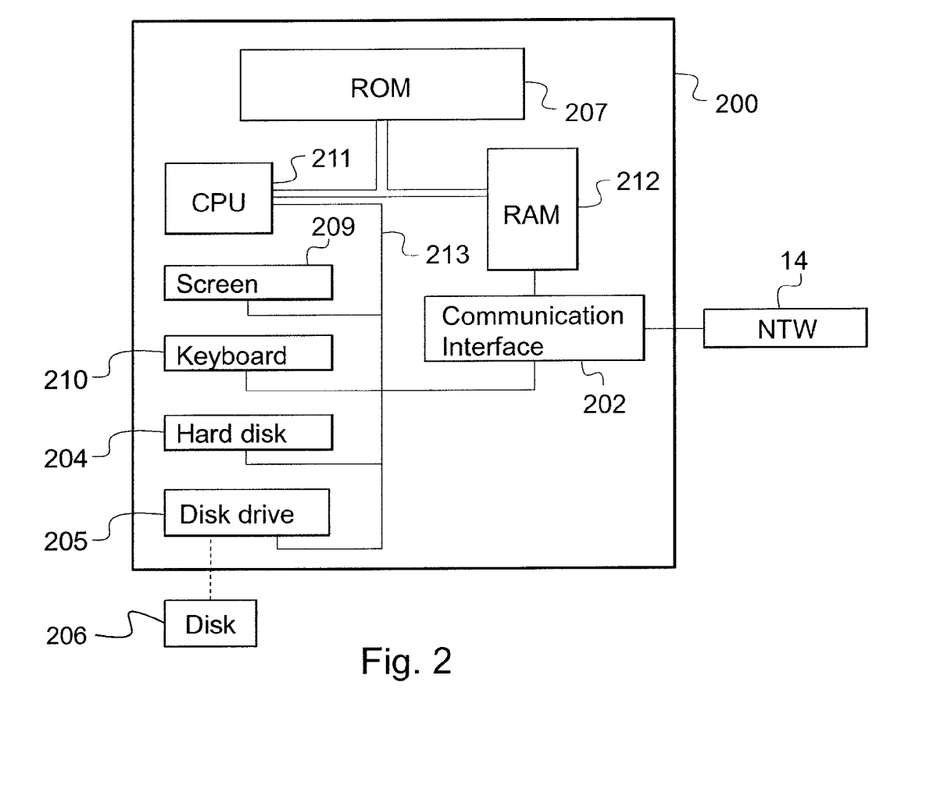
FIG. 2 is a block diagram illustrating an example of architecture for the components of a communication device in which embodiments of the invention may be implemented.

FIG. 2 illustrates an example of architecture for a communication device 200, for example the server 16, the receiving device 10 or the intermediary node 12 of FIG. 1, configured to implement at least one embodiment of the present invention.

The communication device 200 may be a device such as a micro-computer, a workstation or a light portable device. The communication device 200 comprises a communication bus 213 to which there are preferably connected:

- a central processing unit 211, such as a microprocessor, denoted CPU;
- a read only memory 207, denoted ROM, for storing computer programs for implementing the invention;
- a random access memory 212, denoted RAM, for storing the executable code of methods according to embodiments of the invention as well as the registers adapted to record variables and parameters necessary for implementing methods according to embodiments of the invention;
- a communication interface 202 connected to the communication network 14 over which a client-server based communication can be implemented. The communication interface is provided to send requests or responses, such as HTTP requests/responses including web data, possibly in the Push or Pull model of communication, as well as to receive the requests or responses; and
- a data storage means 204 such as a hard disk, for storing computer programs for implementing methods of one or more embodiments of the invention and for storing data that are requested by a receiving device, during the implementation of one or more embodiments of the invention, and for implementing a cache memory.

The cache memory—also called cache—is made of a plurality of cache entries, configured to store data. The cache entries state (or cache information) corresponds to the knowledge of the data currently in cache, for example recent received data like requested data or unsolicited/pushed data from a source server. The data are usually sent together with "cache directives" that state whether the data may be inserted in the cache or not.

The cache information may further include an indication about the freshness (or validity) of the data. That indication is usually sent in the cache directives, thus defining for how long the data may be considered as "fresh" and may be used instead of contacting the server.

Optionally, the communication device 200 may also include a screen 209 for displaying data such as a web page in the case of the receiving device and/or serving as a graphical interface with a user, by means of a keyboard 210 or any other pointing means.

The communication bus provides communication and interoperability between the various elements included in the communication device 200 or connected to it. The representation of the bus is not limiting and in particular the central processing unit is operable to communicate instructions to any element of the communication device 200 directly or by means of another element of the communication device 200.

The disk 206 can be replaced by any information medium such as for example a compact disk (CD-ROM), rewritable or not, a ZIP disk or a memory card and, in general terms, by an information storage means that can be read by a microcomputer or by a microprocessor, integrated or not into the communication device, possibly removable, and adapted to store one or more programs whose execution enables a method according to the invention to be implemented.

The executable code may be stored either in read only memory 207, on the hard disk 204 or on a removable digital medium such as for example a disk 206 as described previously. According to a variant, the executable code of the programs can be received by means of the communication network 14, via the interface 202, in order to be stored in one of the storage means of the communication device 200, such as the hard disk 204, before being executed.

The central processing unit 211 is adapted to control and direct the execution of the instructions or portions of software code of the program or programs according to the invention, which instructions are stored in one of the aforementioned storage means. On powering up, the program or programs that are stored in a non-volatile memory, for example on the hard disk 204 or in the read only memory 207, are transferred into the random access memory 212, which then contains the executable code of the program or programs, as well as registers for storing the variables and parameters necessary for implementing the invention.

In this embodiment, the device is a programmable apparatus which uses software to implement the invention. However, alternatively, the present invention may be implemented in hardware (for example, in the form of an Application Specific Integrated Circuit or ASIC).

The resources or data owned by the server 16 may be stored for example in the ROM, in the hard disk 204 or in the disk 206. As explained below, some of these data may have to be downloaded together to be fully understood. Consequently, a tree representation of the data is generally stored in the server 16.

Finally, the communication device 200 comprises modules for performing the steps of the methods according to the invention, as described below with reference to FIGS. 3 to 7.

In the following description, the terms "cache entry(ies)" or "entry(ies)" refers to data stored therein. Consequently "removing a cache entry" is equivalent to "removing data stored into a cache entry", and "selecting a cache entry" is equivalent to "selecting the data stored into a cache entry".

FIG. 3 shows the general steps of a method for obtaining data from a server 16 according to embodiments of the invention. The process is implemented for example at a receiving device such as the client 10, as described below with reference to FIG. 1 or 2.

According to the general principle of the invention, the method of obtaining data starts after a first exchange of request/response for obtaining data has already been performed between the receiving device and the server, such that there are already existing pushed data in cache of the receiving device.

The process starts when the client wants to send a request R (step 300). According to the present invention, the request includes information (hereafter cache information) about previously pushed data currently stored in the cache memory.

According to a preferred embodiment of the invention, the information only concerns a sub-part of the pushed data, selected so as to be particularly relevant to that request, in order to avoid the server to push useless data.

To that end, the client may compute a distance between the request R and previous requests that led to pushed data (step 301).

If it is determined at step 302 that no previous request is close enough to the request R (or if the request R is the first one), it is directly sent as done in step 306.

If there is one or more previous data in cache that are close enough to the request R (test 302) i.e. to the requested data, a list of pushed cache entries related to the previous requests (i.e. of cache entries corresponding to previously pushed data in response to these previous requests) are gathered (step 303).

The distance between two requests may depend on different parameters. For example, the distance may take into account the type of the requested data (web page, video data, image, JavaScript, JSON, CSS). In particular, the distance can be set as infinite if the type of requested data does not match perfectly with the examined request.

In practice, a HTTP request includes an 'Accept' header that specifies the type of data which is requested. That header can be used to determine if the type of requested data is the same or not.

The distance may also take into account the delay between the examined request and the request R in creation. If this delay is important, the examined request may not be of interest since the data are probably not fresh. In practice, the request may include an "If-Modified-Since" header that indicates the time of the corresponding request.

Furthermore, the URL of the request may also help to evaluate how much two requests are close, in particular since the URL is a structured value. For example the number of hierarchical parts in common can be compared.

For instance, the URL U1 "http://myblog.com/field1/page1.html" is closer to the URL U2 "http://myblog.com/field1/pagenumber2.html" than the URL U3 "http://myblog.com/field/page1.html", even though the character-by-character distance between U1 and U3 is smaller. This is because the URL U1 and U2 have more hierarchical parts in common than U1 and U3 or U2 and U3 have in common.

The distance can thus depend only one of these criteria or in a variant, combine a plurality of these ones.

For example, the distance between R and R' requests may be computed with the following formula:

$$D(R,R')=T(R,R')\cdot(a_0\cdot I(R,R')+a_1/(N(R,R')+1)) \text{ where}$$

T(R,R') is relative to the type of content and is equal to 1 when the type of the requested data of R and R' is identical, otherwise is infinite, I(R,R') is relative to the delay between the requests R and R', N(R,R') is relative to the degree of similarity between the URLs of the requests R and R', it may be based for example on the number of matching hierarchical parts in the URLs of requested data of R and R', $a_0$ and $a_1$ are predetermined weighting factors.

The weighting factors $a_0$ and $a_1$ may be different depending on the requested data. For example, in the case of video streaming, the delay may be a factor of high interest. Indeed, the server selection process will be highly influenced by the network capacities which may vary quickly. In such a case, the value $a_0$ may be increased compared to $a_1$. On the contrary, for web pages, the hierarchical parts criterion is more relevant. In such a case, the value $a_0$ may be increased compared to $a_1$.

The test 302 can lead to the selection of only one previous request R', for example having the smallest distance to the request R being created. In a variant, the test 302 can lead to the selection of all the previous requests complying with certain criteria like matching of the data type, fresh request, and/or URL paths corresponding to a same parent document.

Thus, the selectiveness of the test 302 can be adapted depending on the occupation of the cache. In particular, the more entries the cache may contain, the smallest should be the maximum distance allowed between the requests R and selected previous requests. By restricting the distance constraint, the number of closest requests is small and consequently they are even more relevant for the given request R.

After the closest requests R' have been determined, a list representing a sub-part of cache entries corresponding to previously pushed data in response to these closest previous requests is retrieved (step 303).

A representation of the sub-part of these cache entries is then computed (step 304). The representation may contain status of all retrieved entries. Some entries may also be discarded if, despite the test 302, too many entries are selected.

For instance, some entry representations may vary according some request headers, as defined in practice by the "Vary" header in the HTTP standard. If the headers identified by the "Vary" header in the request R are not matching the headers of the cache entries, the cache entry representation is probably not useful for the request R.

In a variant, the cache entries corresponding to previous requests at the highest distance from the request R can be discarded. Additional parameters such as remaining freshness may be used: if the entry will no longer be fresh in a few seconds, it may be discarded before an entry which will remain fresh for an hour.

If several previous requests are used, the cache entries transmitted should correspond to the pushed data that are linked to many other requested data. For example, an image used in several pages may be part of the page layout (background image, logo . . . ). An image used in only one page is probably an illustration of something specific to this page (it could be a photo corresponding to a news article).

Generally speaking, the representation is computed (step 304) so as to unambiguously represent the cache entries, using as few bits as possible for each entry.

In particular, the version of the cache entry should be recoverable from the representation. Preferably, the cache state (e.g. freshness) of each entry should also appear in the representation. Additional cache state information may be added to the representation. For instance, the use frequency of a cache entry may also be specified.

The representation may represent cache entries using for example Bloom filters. Given the expected small numbers of cache entries to represent, it may be more practical to represent them as IDs and send directly these IDs using a compact binary representation based on a document used to generate IDs (i.e. this document is used as a reference to associate each ID with corresponding data and may be called the reference document; this document is for example the MPD).

To optimize the representation of the cache entries, the context of the request may be used, since both client and server have this knowledge. In particular, when the same data is requested several times, the knowledge of previously related pushed data and of corresponding version can be used and so that previously pushed data (in cache entries) are identified unambiguously by dedicated IDs. To that end, the request may indicate the version of the reference document used to generate the IDs. Typically, if the request is a conditional GET request according to the HTTP standard, the document is specified in the 'Referer' header.

For example, according to the HTTP standard, a conditional request (or "conditional GET") enables a client to check whether a web resource (or data) has been updated on the server side. A conditional request contains information on the temporal version of the web resource the client already has. This information enables the server to check whether its own version of the web resource is newer than the one of the client or not. If the server version is newer, then the web resource is sent to the client, otherwise, the server response indicates that the client version is up-to-date.

If the request is a conditional request, it identifies the temporal version available of the reference document, i.e. the document used to generate the IDs. Indeed a reference document may be refreshed. The reference document may also be identified with the 'Referer' header.

The 'Referer' header is defined by the HTTP standard to include in a request the URL of the document from which the request was initiated. For example, if a user selects a link in the document "http://www.canon.fr" to obtain the document "http://www.canon.fr/camera.html", the request to obtain this latter document can contain a 'Referer' header with the value "http://www.canon.fr".

The ID generation process may consist in taking the reference document and getting a list of resources (or data as defined page 2), those resources being linked, directly or indirectly, from the reference document. This list is ordered according to the structure of the reference document. Each resource is assigned an unambiguous ID, corresponding to its position in the ordered list. This process is done by the client to generate IDs at least from the knowledge of linked resources and the reference document.

On the sever side, this process is done by the server to retrieve data associated to the cache entries from the knowledge of the IDs and the reference document.

In case the request does not contain an unambiguous reference to the document used to generate the IDs, the client may include directly the URL of the previously pushed data for instance or an ETag, as provided by servers on versioned data.

In practice, including the IDs implies extra-overhead but thanks to HTTP/2.0 header indexing mechanisms, this drawback is largely overcome when the same ID is used more than once.

Other approaches may be used to assign IDs to pushed data. In particular, it is known that pushed data may be ordered according their stream IDs. Consequently, the stream IDs may be used.

Once the list of cache entries corresponding to previous pushed data to represent are modelled as a list of items which have an ID and an enumerated value (for the cache state), the list may be optionally ordered according to the IDs.

Then, for each represented cache entry, the following encoding steps may be performed so as to obtain the representation:
  substracting the ID value from the previous cache entry ID in the list if there is one,
  encoding the subtracted value using an universal code such as Exponential-Golomb, and
  encoding the cache entry state as an n-bit integer, n being chosen so that $2^n$ is greater or equal to the maximum number of possible enumerated values. For instance, if the cache entry state is either fresh or not fresh, only 1 bit can be used.

Alternatively, the cache state information may be encoded separately from the list of IDs. In that case, it may be advantageous to encode the whole list of cache state information using well known Run-length Encoding or similar techniques that handling the repetition of same values.

At step 305, cache information (i.e. the computed representation) is inserted within the request R. According to a preferred embodiment, the representation is inserted as a HTTP header, so as it can be processed and used by a network node (e.g. proxy) between the client and the server, this network node being in charge of optimizing the push strategy between the client and server (see FIG. 5).

The request is then transmitted (step 306) to the server.

The client will wait until starting to receive the response to the request (step 307). The client may receive pushed data jointly with this response. In that case, the client will store the pushed data in the cache (step 308). This storage must be done so as to enable steps 303 and 304 for future requests. In particular, a link may be stored between the cache entry corresponding to the request R and the cache entries storing the pushed data.

In a particular embodiment, some of pushed data stored in cache entries are not used, the corresponding cache entries may be discarded. In a variant, unused data may remain in the cache with an indication saying that it was not used. Such indication may be included in a representation within a subsequent request.

The general steps of a method for providing data to a receiving device according to embodiments of the invention will now be described with reference to FIG. 4. The receiving device may correspond to a client 10 or to a proxy 12. This process may be implemented at a server 16 as described below with reference to FIG. 1 or 2.

At step 400, the server receives a request R corresponding for instance to the request R transmitted by the client described with reference to FIG. 3. According to the present invention, that request may include cache information about previously pushed data stored in the cache memory of the client. According to a preferred embodiment, cache information concerns only a relevant part of the pushed data in cache.

At step 401, the server then determines if the request R comprises cache information such as a representation of a list of cache entries of the receiving device corresponding to previous pushed data (see the representation description with reference to FIG. 3). Cache information may be used to identify potential data to push, in other terms, the data that are candidate to be pushed because they are likely to be relevant for the client (step 402, similar to step 404). Indeed, from the knowledge of which pushed data are stored in cache of the receiving device, the server may better understand the receiving device specificities and it may infer what kind of data should be pushed. For instance, in the case of video streaming, if information cache reveals that cache entries correspond to pushed subtitles in a certain language, the server may infer that subtitles in that specific language should be pushed to a client.

This can be generalized to other contexts. As part of responsive design for instance, several CSS may be applied to the same web site, depending on the receiving device constraints. Based on the knowledge of which CSS file is stored in cache, the server may infer the CSS file to send to the receiving device and the related data to push. More generally, the server may identify some characteristics, like for example the kind of receiving device (e.g. PC, mobile, smartphone).

One particular case that may happen for web content is if some data is downloaded preliminary to a request that triggers pushing of that data. If the server knows in advance that given data are subject of being pushed, the server may add in the response an indication that such data can be pushed in the future. This indication may for example be conveyed as a specific HTTP header. The corresponding data would thus be referenced as pushed data in cache entries of the receiving device.

From that list of potential data to push, the server removes data that are already in cache information (step 403).

In particular, the server may identify that some data identified in cache information will not be used in the future, for example because it is not fresh. In that case, the server may add an instruction in the response or in the push message including the pushed data, to remove the corresponding cache entries. This will allow the client to have a more relevant cache and to provide smaller and more relevant cache information to the server in a subsequent request.

On the contrary, if no cache information is found, a specific process can be done to identify potential data to push for fast start (step 404), based on various mechanisms. In practice, in a context of video streaming, the potential data to push are identified from the knowledge of a media file description or MPD and client hints. For web content, static configuration files may identify which other data are interesting to push for which requested data. For example, contents such as JavaScript, CSS and small images are of particular interest to be pushed.

After step 404 or step 403, the request can be processed and the corresponding response generated (step 405). The response is then sent (step 406) to the receiving device and data to push are also sent (step 407). The process is then finished (step 408).

FIG. 5 illustrates the general steps of a method for transmitting data from a server 16 to a receiving device such as a client 10, according to embodiments of the invention. This method may be implemented in a proxy 12 as described with reference to FIG. 1 or 2.

The proxy 12 may already have some pushed data in the cache that the client does not have. It may then be useful that the proxy pushes these data to the client. But the proxy may not be sure that the requested data already changed, in which case the pushed data may not be the ones expected by the proxy. The proxy could wait for the server response, but in that case the proxy may receive the pushed data that he already has in cache.

In these embodiments, the proxy 12 adds a representation of the pushed data it has in cache, to the client request R transmitted to the server 16. The server will answer to the request, the response containing the requested data together with either pushed data or validation information on whether the proxy should pushed data that it already has in cache.

The process starts by the proxy receiving a first request from the client (step 500). That first request may correspond for example to the request R described with reference to FIG. 3. It may include or not cache information of the receiving device.

At step 501, cache information (such as a representation of a list of cache entries of the proxy) for the first request R (i.e. the cache entries in cache information are related to the requested data of the first request R), is generated by the proxy. Proxy cache information will then be compared to cache information sent by the client, if any.

Among the pushed data represented in proxy cache information, if there are pushed data that the client does not have in its own cache information, the proxy will generate push validation request information (which is a representation of pushed data stored in the cache memory of the proxy but not the client) at step 502.

At step 503, the proxy sends a second request to the server, based on the first request R from the client. That second request correspond to the first request into which push validation request information has been added.

At step 504, the response is received, that includes the requested data together with push validation information extracted at step 505.

Push validation information may be for example a list of Boolean values, indicating whether the pushed data identified within push validation request information sent in the second request at step 503 should be pushed to the client.

At step 506, the proxy sends the response to the client.

At step 507, the proxy sends a push message with pushed data targeted by push validation information received from the server as a part of the response to the second request.

Optionally, the response to the second request from the server may also comprise an instruction to remove certain pushed data from proxy and/or client cache entries.

The general steps of the methods described with reference to FIGS. 3 to 5 apply to many contexts.

For example, they may apply to the context of a web page download by a client, during which a web page is modified over time. In particular, when a requested page A (requested data) comprises a plurality of links to other pages A1, A2, A3 (related pushed data), some of these links (e.g. A2, A3) may have been removed since they have been pushed by the server, while other links appeared (A4, A5).

The client may request the same page A to obtain a fresher version A' of it (having the same URL since it is the same web page). To that end, the client includes, in the request for fresh page A', cache information (such as a representation of a list of cache entries) comprising information about a relevant sub-part of cache entries corresponding to previous pushed data for the same page A. For instance, in the situation described here, cache information may represent A1, A2, and A3 that has been pushed and stored in cache when obtaining the requested page A. Other pushed data stored in cache but that are not related to the requested page A are not included in cache information, thus avoiding the overload due to unrelated and useless data in cache information.

In response to the request, the client receives A' together with a push message including the new links A4 and A5. The pushed data A4 and A5 are related to the requested web page A' and are not already in cache. They have a high probability to be used when loading the web page A'. Thus, unneeded data is avoided to be sent.

While this example illustrates the case of a web page download, the invention may also be applied to Dynamic Adaptive Streaming over HTTP (DASH). Indeed, in the context of video streaming, a client may request a media file description or MPD (for Media Presentation Description) that is related to specific media segments (related data to be pushed).

These media segments, like JPIP images, will probably not evolve as much as links may change in a specific web page in CSS or JavaScript. The MPD may actually change more often.

In other terms, when the client requests an MPD, what is pushed with it (i.e. media segments) does usually not change over time. However, the requested MPD is more often subject to change. Typically, new subtitles, new localized soundtrack (English, French . . . ), new video resolution or enhancement layers imply big changes in the MPD.

In addition, video segments may be dynamically inserted or deleted from an MPD, in the case for instance of added value content or advertisements. In the context of an MPD change, the invention becomes highly relevant for optimized transmission, especially since video segments may be quite big. In that case, sending useless big video segments may not only waste bandwidth but will also delay other potentially useful video segments.

FIG. 6 and FIG. 7 are examples respectively related to methods for obtaining data and providing data between a server and a client (e.g. the server/client of FIG. 1 or 2), together performing Dynamic Adaptive Streaming over HTTP (DASH).

As described below, the embodiments related to DASH are just examples of implementation of concepts of the invention described above with reference to FIG. 3 or 4, and the present invention is thus not limited to these embodiments.

FIG. 6 illustrates a specific case of a client requesting streaming content over HTTP using DASH.

At step 600, the client create a request for data, here the requested data correspond to the media description file of the content to stream.

Similarly to steps 301 and 302 of FIG. 3, steps 601 and 602 allows determining similar previous requests. In the context of DASH, the last MPD request made to that server may be for example determined as the closest previous request by default. As described with reference to FIG. 3, the distance may also take into account the degree of similarity between the URL in case several different media contents are available on the server.

Steps 603 and 604 are similar to steps 303 and 304 of FIG. 3. Generally, the cache entries corresponding to previously pushed media segments that have not been used since they have been pushed are not included in the representation. Following steps 605 to 607 are also similar to steps 305 to 307 of FIG. 3.

Since pushed data in the context of DASH (i.e. media segments) may be large, it is important to remove not used pushed data from the cache.

To that end, for each amount of pushed data to process (step 608) it is determined whether the pushed data is useful (step 609). If so, the pushed data are stored in cache (step 610) similarly to step 308 of FIG. 3. Otherwise, the pushed data are not stored. The process ends when all pushed data are processed (step 611).

As explained below, cache representation information may guide the server on what the client may actually be interested in.

For example, if previously pushed data are not stored in cache, the server may infer that either they were removed or they were useless.

For instance, if the representation included in the request indicates that the relevant cache entries correspond only to standard-definition (SD) video segments and not to high-definition (HD) video segments, the server may infer that the client will preferably being pushed SD segments. Alternatively, if the representation included in the request indicates that the relevant cache entries correspond to segments of both types (SD and HD), the server will push both SD and HD video segments.

FIG. 7 illustrates a specific case of a server providing streaming content over HTTP using DASH.

At step 700, the process starts with the reception of a request for data from a receiving device such as a client. In this example, the requested data correspond to a media description file (MPD) of streaming content (video), as described with reference to FIG. 6.

At step 701, it is determined if the request comprises cache information (i.e. a representation of a list of cache entries of the receiving device corresponding to previous pushed data). If not, the server identifies potential data to push for fast start (step 706).

On the contrary, if the request comprises cache information, it provides the knowledge of the cache entries corresponding to previously pushed data. Since these previously pushed data are related to the closest previous request (see steps 603 and 604 of FIG. 6), the server must be able to identify (step 702) the MPD targeted by this closest previous request.

In practice, it is done by including the URL of this previous MPD in the request, for example in a "Referer" header.

The MPD targeted by the closest previous request may correspond to the currently requested MPD. It may also be a different version of it. In that case, proper versioning handling must be done by the server.

At step 703, cache information is used to get the media segments identifiers.

At step 704, cache information is used to identify, based on the identifiers, the media segments that are already in cache.

As explained above, cache information allows inferring what kind of data the client is more likely interested in (i.e. what it will store in cache) when streaming the video corresponding to the MPD targeted by the request. For instance, the server may infer that it should push 30 seconds of SD and HD segments, and in addition Portuguese subtitles.

It is to be noted that, in case the identification in 703 is based on MPD knowledge, steps 703 and 704 are the same. If it is with a different means, for instance based on push order, step 703 identifies the URL and step 704 relates to the media segments. Based on the inference of what kind of data should be preferably pushed, cache information is used to determine (step 705) among them, the data to be pushed that are not already in cache. This step is similar to step 706 of identifying potential data to push for fast start, but it is based on the knowledge of past interactions with the client, as represented by cache information.

Once the media segments to push are identified (steps 705 or 706), the response to the request is generated (step 707), the response is sent (step 708), the identified media segments are pushed (step 709) and the process ends at step 710.

The steps 707 to 710 are very similar to steps 405 to 408 of FIG. 4.

Although the present invention has been described hereinabove with reference to specific embodiments, the present invention is not limited to the specific embodiments, and modifications which lie within the scope of the present invention will be apparent to a person skilled in the art. Many further modifications and variations will suggest themselves to those versed in the art upon making reference to the foregoing illustrative embodiments, which are given by way of example only and which are not intended to limit the scope of the invention as determined by the appended claims. In particular different features from different embodiments may be interchanged, where appropriate.

The invention claimed is:

1. A method of obtaining data from a server, the method being implemented at a receiving device and comprising the following steps:
   receiving a push message comprising pushed data from the server;
   storing received pushed data in a memory of the receiving device, the stored data being identified as being pushed data;
   selecting a sub-part of the pushed data received from the server and stored in the memory;
   transmitting a request for data comprising information about pushed data stored in the memory of the receiving device, wherein the request for data includes information referring only to the sub-part of the pushed data;

receiving a response to said request comprising requested data;
wherein selecting the sub-part of pushed data comprises:
computing a distance between the request and at least one previous request for previously requested data stored in the memory;
selecting at least one of the previous requests based on the distance to the request, and
wherein said sub-part of pushed data comprises only pushed data stored in the memory, that have been pushed in response to the selected previous requests,
wherein the step of receiving the response to said request comprising requested data allows the server to avoid pushing data available at the receiving device.

2. The method of claim 1, wherein said information is an encoded representation of said pushed data, and wherein said representation comprises a list of IDs unambiguously identifying each one of said pushed data and a corresponding cache state value.

3. The method of claim 1, comprising receiving a push message comprising further pushed data related to the requested data, said further pushed data being different from the pushed data already in the memory.

4. The method of claim 3, wherein the push message from the server comprises an instruction to remove unused data from the memory.

5. The method of claim 1, wherein the requested data are a media description file or a media presentation file (MPD).

6. The method of claim 5, wherein said requested MPD comprises a reference document associating each ID with corresponding pushed data.

7. The method of claim 1, wherein the response from the server comprises an instruction to remove unused data from the memory.

8. A method of providing data from a server to a receiving device, the method being implemented at the server and comprising the following steps:
receiving a request for data comprising information about pushed data stored in a memory of the receiving device, wherein the request for data includes information referring only to a sub-part of the pushed data stored in the memory of the receiving device, said sub-part of pushed data comprising only pushed data stored in said memory of the receiving device that have been pushed in response to previous requests selected based on a distance between these previous request and the request;
transmitting a response to said request comprising the requested data;
transmitting a push message comprising further pushed data related to the requested data, the further pushed data being determined based on said information comprised in the request,
wherein the step of transmitting the push message comprising further pushed data related to the requested data allows the server to avoid pushing data available at the receiving device.

9. The method of claim 8, comprising inferring, based on the information in the received request, what data is to be further pushed to the receiving device.

10. The method of claim 9, wherein inferring comprises analyzing the type of content of the pushed data stored in the memory of the receiving device.

11. The method of claim 8, wherein said information is an encoded representation of said pushed data, and wherein said representation comprises a list of ID unambiguously identifying each one of said pushed data and a corresponding cache state value.

12. The method of claim 11, wherein said requested MPD comprises a reference document associating each ID with corresponding pushed data.

13. The method of claim 8, wherein the requested data are a media description file or a media presentation file (MPD).

14. The method of claim 8, wherein the response or the push message comprises an instruction to remove unused data from the memory of the receiving device.

15. A method of transmitting data from a server to a receiving device, the method being implemented at an intermediary node and comprising the following steps:
receiving, from the receiving device, a first request for data comprising information about pushed data stored in a memory of the receiving device wherein the first request for data includes information referring only to a sub-part of the pushed data stored in said memory of the receiving device, said sub-part of pushed data comprising only pushed data stored in said memory of the receiving device that have been pushed in response to previous requests selected based on a distance between these previous request and the first request;
transmitting, to the server, a second request for the requested data, based on the first request and comprising information about data stored in a memory of the intermediary node,
receiving, from the server, a response to said second request, said response comprising validity information about data stored in the memory of the intermediary node,
transmitting, to the receiving device, a response to the first request comprising requested data, and
transmitting, to the receiving device, at least one push message comprising further pushed data related to said requested data, the further pushed data being determined by the intermediary node from the data stored in intermediary node memory, based on said validity information,
wherein the step of transmitting the at least one push message comprising further pushed data related to said requested data allows the server to avoid pushing data available at the receiving device.

16. A method of exchanging data between a server and a receiving device, the method comprising the following steps:
receiving, at the receiving device, a push message comprising pushed data from the server;
storing received pushed data in a memory of the receiving device, the stored data being identified as being of push type;
selecting a sub-part of the pushed data received from the server and stored in the memory;
transmitting, from the receiving device to the server, a request for data comprising information about pushed data stored in the memory of the receiving device, wherein the request for data includes information referring only to the sub-part of the pushed data;
receiving, from the server, at the receiving device, a response to said request comprising requested data,
wherein selecting the sub-part of pushed data comprises the following steps:
computing a distance between the request and at least one previous request for previously requested data stored in the memory;

selecting at least one of the previous requests based on the distance to the request; and wherein said sub-part of pushed data comprises only pushed data stored in the memory that have been pushed in response to the selected previous requests, wherein the step of receiving the response to said request comprising requested data allows the server to avoid pushing data available at the receiving device.

17. A receiving device for obtaining data from a server, the receiving device comprising:

a memory;

a processor coupled to the memory which acts as the following:

a module for receiving a push message comprising pushed data from the server;

a module for storing received pushed data in a memory of the receiving device, the stored data being identified as being of push type;

a module for selecting a sub-part of the pushed data received from the server and stored in the memory;

a module for transmitting a request for data comprising information about pushed data stored in the memory of the receiving device, wherein the request for data includes information referring only to the sub-part of the pushed data;

a module for receiving a response to said request comprising requested data, wherein the module for selecting the sub-part of pushed data is configured for:

computing a distance between the request and at least one previous request for previously requested data stored in the memory;

selecting at least one of the previous requests based on the distance to the request; and wherein said sub-part of pushed data comprises only pushed data stored in the memory that have been pushed in response to the selected requests, wherein the module for receiving the response to said request comprising requested data allows the server to avoid pushing data available at the receiving device.

18. An intermediary node for transmitting data from a server to a receiving device, the intermediary node comprising:

a memory;

a processor coupled to the memory which acts as the following:

a module for receiving, from the receiving device, a first request for data comprising information about pushed data stored in a memory of the receiving device wherein the first request for data includes information referring only to a sub-part of the pushed data stored in said memory of the receiving device, said sub-part of pushed data comprising only pushed data stored in said memory of the receiving device that have been pushed in response to previous requests selected based on a distance between these previous request and the first request, a module for transmitting, to the server, a second request for the requested data, based on the first request and comprising information about data stored in a memory of the intermediary node, a module for receiving, from the server, a response to said second request, said response comprising validity information about data stored in the memory of the intermediary node, a module for transmitting, to the receiving device, a response to the first request comprising requested data, and a module for transmitting, to the receiving device, at least one push message comprising further pushed data related to said requested data, the further pushed data being determined by the intermediary node from the data stored in the memory of the intermediary node, based on said validity information, wherein the module for transmitting the at least one push message comprising further pushed data related to said requested data allows the server to avoid pushing data available at the receiving device.

19. A system for exchanging data between a server and a receiving device, the system comprising:

a memory;

a processor coupled to the memory which acts as the following:

a module for receiving, at the receiving device, a push message comprising pushed data from the server;

a module for storing received pushed data in a memory of the receiving device, the stored data being identified as being of push type;

a module for selecting a sub-part of the pushed data received from the server and stored in the memory;

a module for transmitting, from the receiving device to the server, a request for data comprising information about pushed data stored in the memory of the receiving device, wherein the request for data includes information referring only to the sub-part of the pushed data;

a module for receiving, from the server, at the receiving device, a response to said request comprising requested data, wherein the module for selecting the sub-part of pushed data is configured for:

computing a distance between the request and at least one previous request for previously requested data stored in the memory;

selecting at least one of the previous requests based on the distance to the request; and wherein said sub-part of pushed data comprises only pushed data stored in the memory that have been pushed in response to the selected previous requests, wherein the module for receiving the response to said request comprising requested data allows the server to avoid pushing data available at the receiving device.

* * * * *